(12) United States Patent
Stewart

(10) Patent No.: US 6,351,210 B1
(45) Date of Patent: Feb. 26, 2002

(54) SEAT BELT USAGE INDICATING DEVICE

(76) Inventor: Tameka D. Stewart, 102 Larkspur Ct., Jackson, MI (US) 49203

( * ) Notice: Subject to any disclaimer, the term of this patent is extended or adjusted under 35 U.S.C. 154(b) by 0 days.

(21) Appl. No.: 09/709,256

(22) Filed: Nov. 10, 2000

(51) Int. Cl.$^7$ ................................................ G08B 3/00
(52) U.S. Cl. ................ 340/457.1; 340/459; 340/667; 340/687; 340/692; 340/693.5; 180/268; 200/61.58 B
(58) Field of Search .............................. 340/457.1, 459, 340/573.1, 667, 692, 693.5, 687; 180/268; 200/61.58 B

(56) References Cited

U.S. PATENT DOCUMENTS

| | | | |
|---|---|---|---|
| 4,236,141 A | * 11/1980 | Terabayashi et al. | .... 340/457.1 |
| 4,849,733 A | 7/1989 | Conigiliaro et al. | |
| 4,885,566 A | * 12/1989 | Aoki et al. | .............. 340/457.1 |
| 5,406,252 A | 4/1995 | Dear | |
| 5,482,314 A | 1/1996 | Corrado et al. | |
| 5,483,221 A | 1/1996 | Mutter et al. | |
| D374,327 S | 10/1996 | Marguerie | |
| 5,627,512 A | * 5/1997 | Bogar | ..................... 340/457.1 |
| 5,760,684 A | * 6/1998 | Orbach | ..................... 340/457.1 |
| 5,871,063 A | 2/1999 | Young | |
| 5,970,587 A | * 10/1999 | Knox | ........................... 24/633 |
| 6,002,325 A | * 12/1999 | Conaway | ................ 340/457.1 |

* cited by examiner

Primary Examiner—Daniel J. Wu

(57) ABSTRACT

A seat belt usage indicating device for indicating that a male portion of a seat belt is engaging a female portion of a seat belt buckle. The seat belt usage indicating device includes a housing. The housing has a front wall, a back wall, and a peripheral wall extending therebetween. The peripheral wall has a slot therein for releasably engaging a male portion of a seat belt buckle. A plate extends away from and is integrally coupled to the peripheral wall. The plate is adapted for removably extending into and releasably engages the female portion of a seat belt buckle. Control circuitry is adapted for sending a signal to a speaker. The control circuitry is securely mounted in the housing. A sensing means for sensing the male portion is positioned in the housing such that male portion may engage the sensing means. The sensing means is electrically coupled to the control circuitry. A speaker for emitting a sound is securably mounted in the housing and extends outwardly from the front wall. The speaker is operationally coupled to the control circuitry. The control circuitry sends a signal to the speaker when the male portion is removed from the housing.

9 Claims, 3 Drawing Sheets

SEAT BELT USAGE INDICATING DEVICE

BACKGROUND OF THE INVENTION

1. Field of the Invention

The present invention relates to seat belt usage indicating devices and more particularly pertains to a new seat belt usage indicating device for indicating that a male portion of a seat belt is engaging a female portion of a seat belt buckle.

2. Description of the Prior Art

The use of seat belt usage indicating devices is known in the prior art. More specifically, seat belt usage indicating devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,849,733; U.S. Pat. No. 5,483,221; U.S. Pat. No. 5,871,063; U.S. Pat. No. 5,406,252; U.S. Pat. No. 5,482,314; and Des. U.S. Pat. No. 374,327.

While these devices fulfill their respective, particular objectives and requirements, the aforementioned patents do not disclose a new seat belt usage indicating device. The inventive device includes a housing. The housing has a front wall, a back wall, and a peripheral wall extending therebetween. The peripheral wall has a slot therein for releasably engaging a male portion of a seat belt buckle. A plate extends away from and is integrally coupled to the peripheral wall. The plate is adapted for removably extending into and releasably engages the female portion of a seat belt buckle. Control circuitry is adapted for sending a signal to a speaker. The control circuitry is securely mounted in the housing. A sensing means for sensing the male portion is positioned in the housing such that male portion may engage the sensing means. The sensing means is electrically coupled to the control circuitry. A speaker for emitting a sound is securably mounted in the housing and extends outwardly from the front wall. The speaker is operationally coupled to the control circuitry. The control circuitry sends a signal to the speaker when the male portion is removed from the housing.

In these respects, the seat belt usage indicating device according to the present invention substantially departs from the conventional concepts and designs of the prior art, and in so doing provides an apparatus primarily developed for the purpose of indicating that a male portion of a seat belt is engaging a female portion of a seat belt buckle.

SUMMARY OF THE INVENTION

In view of the foregoing disadvantages inherent in the known types of seat belt usage indicating devices now present in the prior art, the present invention provides a new seat belt usage indicating device construction wherein the same can be utilized for indicating that a male portion of a seat belt is engaging a female portion of a seat belt buckle.

The general purpose of the present invention, which will be described subsequently in greater detail, is to provide a new seat belt usage indicating device apparatus and method which has many of the advantages of the seat belt usage indicating devices mentioned heretofore and many novel features that result in a new seat belt usage indicating device which is not anticipated, rendered obvious, suggested, or even implied by any of the prior art seat belt usage indicating devices, either alone or in any combination thereof.

To attain this, the present invention generally comprises a housing. The housing has a front wall, a back wall, and a peripheral wall extending therebetween. The peripheral wall has a slot therein for releasably engaging a male portion of a seat belt buckle. A plate extends away from and is integrally coupled to the peripheral wall. The plate is adapted for removably extending into and releasably engages the female portion of a seat belt buckle. Control circuitry is adapted for sending a signal to a speaker. The control circuitry is securely mounted in the housing. A sensing means for sensing the male portion is positioned in the housing such that male portion may engage the sensing means. The sensing means is electrically coupled to the control circuitry. A speaker for emitting a sound is securably mounted in the housing and extends outwardly from the front wall. The speaker is operationally coupled to the control circuitry. The control circuitry sends a signal to the speaker when the male portion is removed from the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new seat belt usage indicating device apparatus and method which has many of the advantages of the seat belt usage indicating devices mentioned heretofore and many novel features that result in a new seat belt usage indicating device which is not anticipated, rendered obvious, suggested, or even implied by any of the prior art seat belt usage indicating devices, either alone or in any combination thereof.

It is another object of the present invention to provide a new seat belt usage indicating device which may be easily and efficiently manufactured and marketed.

It is a further object of the present invention to provide a new seat belt usage indicating device which is of a durable and reliable construction.

An even further object of the present invention is to provide a new seat belt usage indicating device which is susceptible of a low cost of manufacture with regard to both materials and labor, and which accordingly is then susceptible of low prices of sale to the consuming public, thereby making such seat belt usage indicating device economically available to the buying public.

Still yet another object of the present invention is to provide a new seat belt usage indicating device which provides in the apparatuses and methods of the prior art some of the advantages thereof, while simultaneously overcoming some of the disadvantages normally associated therewith.

Still another object of the present invention is to provide a new seat belt usage indicating device for indicating that a male portion of a seat belt is engaging a female portion of a seat belt buckle.

Yet another object of the present invention is to provide a new seat belt usage indicating device which includes a housing. The housing has a front wall, a back wall, and a peripheral wall extending therebetween. The peripheral wall has a slot therein for releasably engaging a male portion of a seat belt buckle. A plate extends away from and is integrally coupled to the peripheral wall. The plate is adapted for removably extending into and releasably engages the female portion of a seat belt buckle. Control circuitry is adapted for sending a signal to a speaker. The control circuitry is securely mounted in the housing. A sensing means for sensing the male portion is positioned in the housing such that male portion may engage the sensing means. The sensing means is electrically coupled to the control circuitry. A speaker for emitting a sound is securably mounted in the housing and extends outwardly from the front wall. The speaker is operationally coupled to the control circuitry. The control circuitry sends a signal to the speaker when the male portion is removed from the housing.

Still yet another object of the present invention is to provide a new seat belt usage indicating device that is retrofittable to existing automobiles.

Even still another object of the present invention is to provide a new seat belt usage indicating device that differentiates between a person and cargo.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
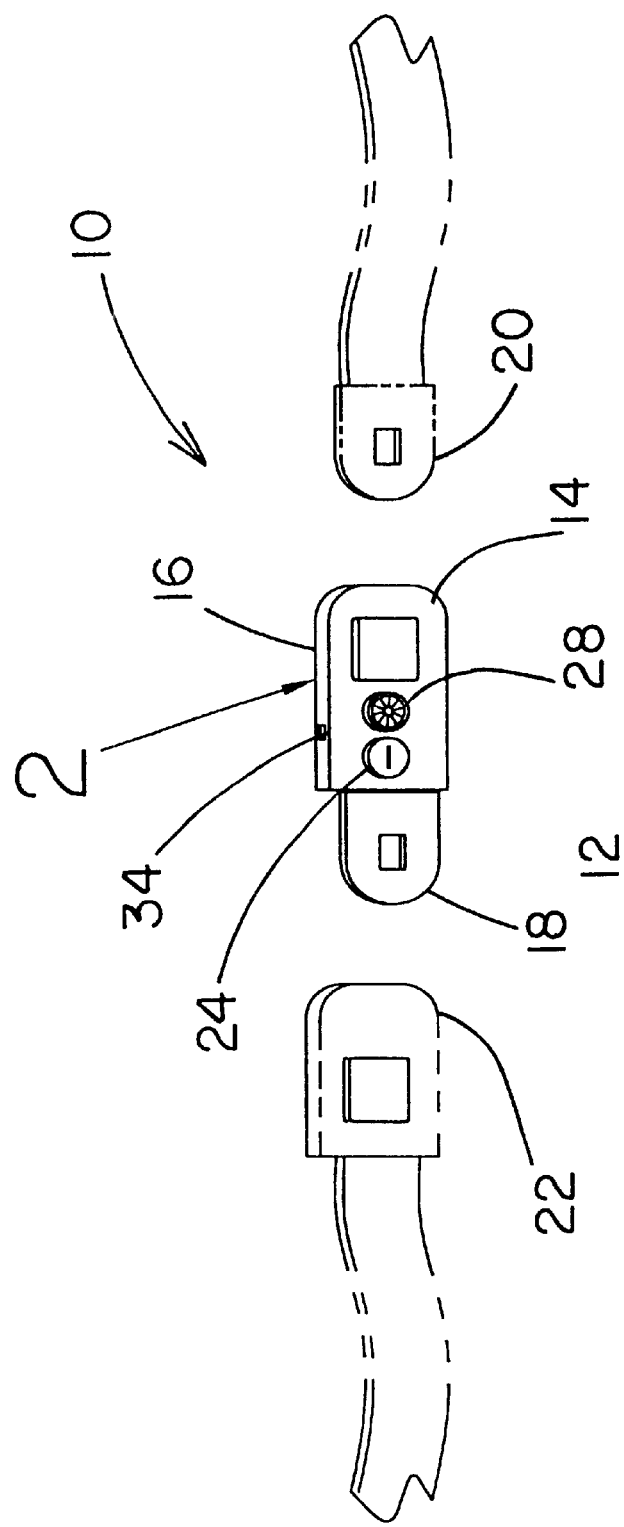
FIG. 1 is a schematic front perspective view of the first embodiment of a new seat belt usage indicating device according to the present invention.
Figure 2:
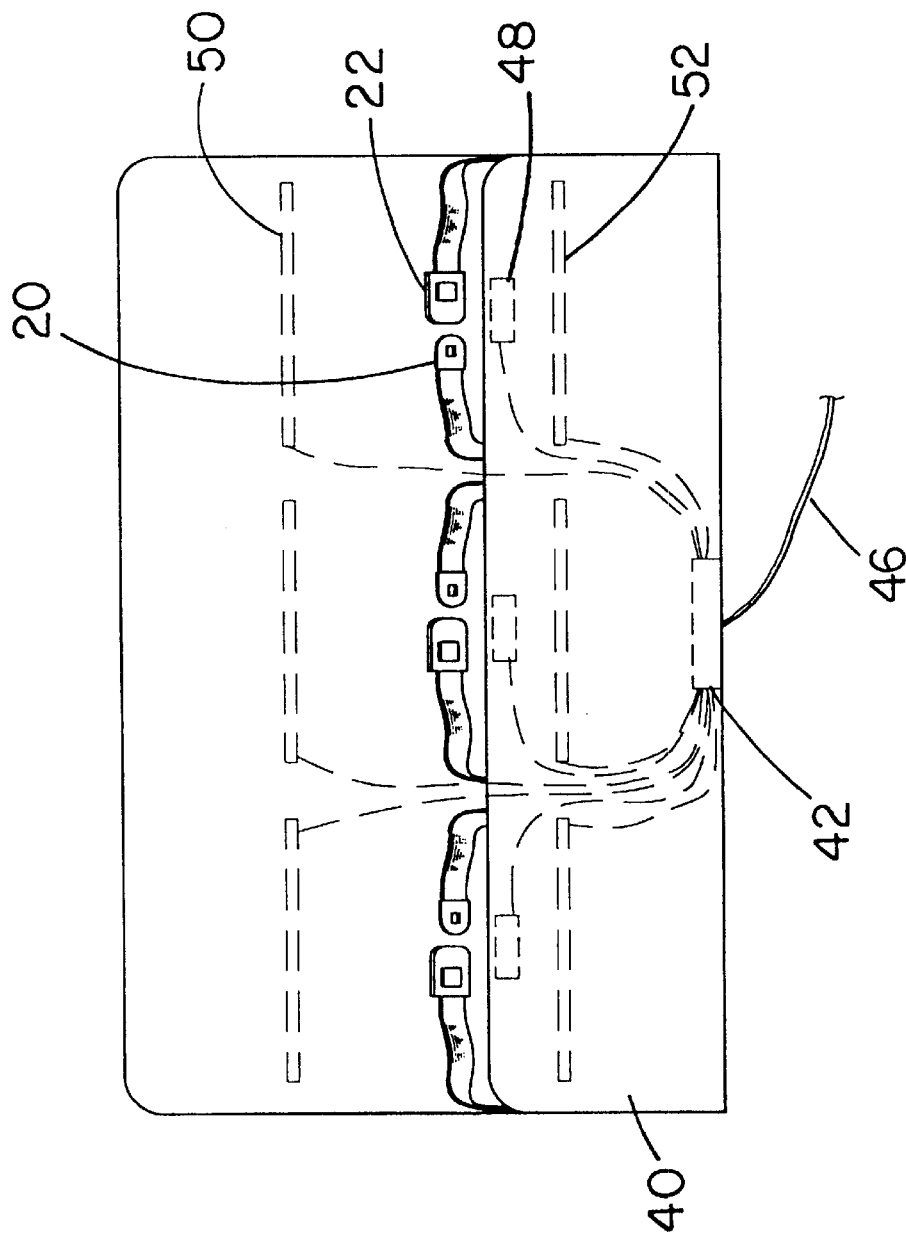
FIG. 2 is a schematic front view of the second embodiment of the present invention.
Figure 3:
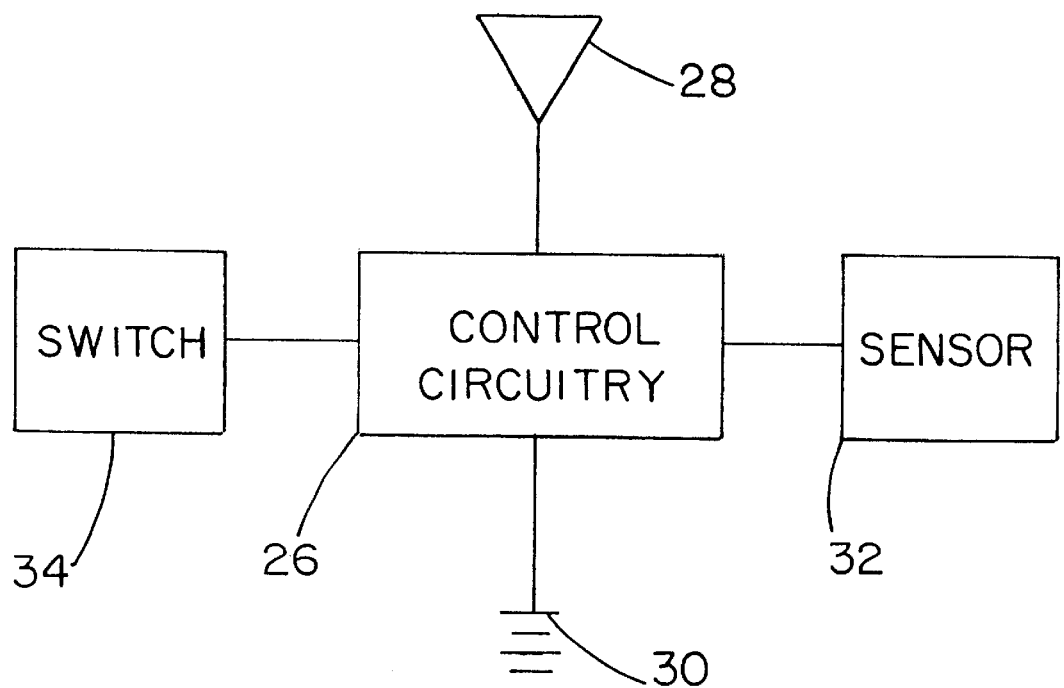
FIG. 3 is an electronic schematic view of the present invention.

With reference now to the drawings, and in particular to FIGS. 1 through 3 thereof, a new seat belt usage indicating device embodying the principles and concepts of the present invention and generally designated by the reference numeral 10 will be described.

As best illustrated in FIG. 1, the first embodiment of the seat belt usage indicating device 10 generally comprises a housing 12. The housing 12 has a front wall 14, a back wall, and a peripheral wall 16 extending therebetween. The peripheral wall 16 has a slot therein for releasably engaging the male portion 20 of the seat belt buckle. A plate 18 extends away from and is integrally coupled to the peripheral wall 16. The plate 18 is adapted for removably extending into and releasably engaging the female portion 22 of the seat belt buckle. A locking means 24 selectively locks the female portion 22 to the housing.

Control circuitry 26 is adapted for sending a signal to a speaker 28. The control circuitry 26 is securely mounted in the housing 12. A power supply 30, consisting of a battery, is electrically coupled to the control circuitry 26 and preferably positioned in the housing 12.

A sensing means 32 for sensing the male portion 20 is positioned in the housing 12 such that male portion 20 may engage the sensing means 32. The sensing means 32 is electrically coupled to the control circuitry 26.

A speaker 28 for emitting a sound is securably mounted in the housing 12 and extends outwardly from the front wall 14. The speaker 26 is operationally coupled to the control circuitry 26.

An actuator 34 turns the control circuitry 26 on and off. The actuator 34 comprises a switch mounted in the peripheral wall 16. The switch is preferably sunken into the peripheral wall 16 so that child would have difficulty turning the control circuitry off.

In use, the housing 12 has the male and female buckle adapters. When the male portion 20 is placed in the housing 12, the circuit is closed. The control circuitry 26 sends a signal to the speaker 28 when the male portion 20 is removed from the housing 12.

The second embodiment is a system for placement in the back seat 40 of an automobile. Control circuitry 26 is adapted for sending a signal to a speaker 28. The control circuitry 26 is securely mounted in a housing 42 in the automobile.

A plurality of sensing means 32 sense whether or not each of the male portions of the seat belt buckles are engaged to a female portion. Each of the sensing means 32 is operationally coupled to the control circuitry 26, wherein each of the sensing means 32 is mounted in one of the seat buckles. A speaker 28 for emitting a sound is operationally coupled to the control circuitry 26.

A power supply 30 is operationally coupled to the control circuitry. The power supply 30 is preferably an automobile electrical system.

The control circuitry is preferably electrically coupled by a wire 46 to the dash board of the automobile.

Each of a plurality of pressure sensing sets comprises a seat sensor 48, a back sensor 50 and a leg sensor 52. The seat sensor 48 is positioned within a seat portion for sensing a person sitting on the seat. The back sensor 50 is positioned within a back portion for sensing a person's back abutting there against. The leg sensor 52 is positioned within a front portion of the seat portion for sensing a person's legs abutting there against. Each of the pressure sensing sets is operationally coupled to the control circuitry 26. Each of the pressure sensing sets is positioned to generally relate to one seat belt buckle.

In use, a person sitting on the seat actuates the pressure sensing sets. The pressure sensing sets actuate the sensing means such that a signal is sent to the speaker if the male portion is not engaged to the associated female portion. The pressure sensing sets help distinguish between a person and cargo.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seat belt usage indicating device, said device being removably couplable to a male portion and a female portion of a seat belt buckle, said device comprising:
    a housing, said housing having a front wall, a back wall, and a peripheral wall extending therebetween, said peripheral wall having a slot therein for releasably engaging said male portion of said seat belt buckle, a plate extending away from and being integrally coupled to said peripheral wall, said plate being adapted for removably extending into and releasably engaging said female portion of said seat belt buckle;
    control circuitry, said control circuitry being adapted for sending a signal to a speaker, said control circuitry being securely mounted in said housing;
    a sensing means for sensing said male portion being positioned in said housing such that male portion may engage said sensing means, said sensing means being electrically coupled to said control circuitry;
    a speaker for emitting a sound, said speaker being securably mounted in said housing and extending outwardly from said front wall, said speaker being operationally coupled to said control circuitry;
    an actuator for turning said control circuitry on and off being operationally coupled to said control circuitry, said actuator comprising a switch mounted in said peripheral wall; and
    wherein said control circuitry sends a signal to said speaker when said male portion is removed from said housing.

2. The seat belt usage indicating device as in claim 1, wherein said housing further comprises:
    a locking means selectively locks said female portion to said housing.

3. A seat belt usage indicating system, said system being integrated into an automobile seat and seat belts, said system comprising:
    control circuitry, said control circuitry being adapted for sending a signal to a speaker, said control circuitry being securely mounted in a housing;
    a plurality of sensing means for sensing each male portion of a plurality of seat belt buckles being engaged to an associated female portion, each of said sensing means being operationally coupled to said control circuitry, wherein each of said sensing means is mounted in one of said seat buckles;
    a speaker for emitting a sound, said speaker being operationally coupled to said control circuitry;
    a power supply being operationally coupled to said control circuitry, said power supply being an automobile electrical system;
    a plurality of pressure sensing sets, each of said pressure sensing sets comprising;
        a seat sensor, said seat sensor being positioned within a seat portion for sensing a person sitting on said seat;
        a back sensor, said back sensor being positioned within a back portion for sensing a person's back abutting there against;
        a leg sensor, said leg sensor being positioned within a front portion of said seat portion for sensing a person's legs abutting there against;
    each of said pressure sensing sets being operationally coupled to said control circuitry, each of said pressure sensing sets being positioned to generally relate to one seat belt buckle;
    wherein a person sitting on said seat actuates said pressure sensing sets, wherein said pressure sensing sets actuate said sensing means such that a signal is sent to said speaker if said male portion is not engaging said female portion.

4. A seat belt usage indicating system including:
    a housing being removably couplable to a male portion and a female portion of a seat belt buckle, said housing having a front wall, a back wall, and a peripheral wall extending therebetween, said peripheral wall having a slot therein for releasably engaging said male portion of said seat belt buckle, a plate extending away from and being coupled to said peripheral wall, said plate being adapted for removably extending into and releasably engaging said female portion of said seat belt buckle;
    a sound emitting device for emitting a sound, said sound emitting device being mounted in said housing;
    control circuitry mounted in said housing, said control circuitry being operationally coupled to said sound emitting device for causing said sound emitting device to emit a sound;
    a sensing means for sensing said male portion being positioned in said housing, said sensing means being electrically coupled to said control circuitry for signaling said control circuitry when said male portion is positioned in said housing; and
    an actuator for turning said control circuitry on and off being operationally coupled to said control circuitry.

5. The seat belt usage indicating system as in claim 4, wherein said actuator comprises a switch mounted on one of said walls of said housing.

6. The seat belt usage indicating system as in claim 4, additionally comprising a seat, wherein said actuator comprises a seat sensor positioned within a seat portion of said seat for sensing a person sitting on said seat, wherein a person sitting on the seat actuates said seat sensor.

7. The seat belt usage indicating system as in claim 4, additionally comprising a seat, wherein said actuator comprises a back sensor positioned within a back portion of the seat for sensing a person sitting on said seat, wherein a person sitting on said seat actuates said seat sensor.

8. The seat belt usage indicating system as in claim 4, additionally comprising a seat, wherein said actuator comprises a leg sensor positioned within a front portion of the seat for sensing a person sitting on said seat, wherein a person sitting on said seat actuates said seat sensor.

9. The seat belt usage indicating system as in claim 4, additionally comprising a seat, wherein said actuator includes:

- a seat sensor positioned within a seat portion for sensing a person sitting on said seat;
- a back sensor positioned within a back portion for sensing a person's back abutting there against;
- a leg sensor positioned within a front portion of said seat portion for sensing a person's legs abutting there against; and
- wherein a person sitting on said seat actuates at least one of seat, back and leg sensors.

\* \* \* \* \*